Jan. 11, 1955 I. SHAPIRO Re. 23,922

TRACK SHOE

Original Filed Feb. 10, 1951 2 Sheets-Sheet 1

INVENTOR.
Isadore Shapiro
BY
Frank H. Marks,
Attorney

Jan. 11, 1955 I. SHAPIRO Re. 23,922

TRACK SHOE

Original Filed Feb. 10, 1951 2 Sheets-Sheet 2

INVENTOR.
Isadore Shapiro
BY
Frank H. Marks
Attorney

United States Patent Office

Re. 23,922

Reissued Jan. 11, 1955

23,922

TRACK SHOE

Isadore Shapiro, Beverly Hills, Calif., assignor, by mesne assignments, to A. R. Hyde & Sons Company, a corporation of Massachusetts Original No. 2,660,813, dated December 1, 1953, Serial No. 210,313, February 10, 1951. Application for reissue September 28, 1954, Serial No. 459,225

2 Claims. (Cl. 36—2.5)

Matter enclosed in heavy brackets [ ] appears in the original patent but forms no part of this reissue specification; matter printed in italics indicates the additions made by reissue.

My invention relates to shoes and has special application to shoes intended primarily for sports involving considerable activity. More particularly, my invention has a special application to track shoes. [However, it is also applicable to shoes for football, baseball, boxing, walking, golf, etc.]

In games involving great physical activity and especially in running, it is desired that a shoe be of extremely light weight and fit the foot snugly in the manner of a glove, in order that the wearer may be practically unconscious of the presence thereof. In the manufacture of such shoes, therefore particular pains are taken to make the upper of the shoe of extremely pliable, lightweight material, such as kidskin and other leathers. To achieve lightness of weight it is customary not to provide a lining. Such materials are stretchable to an undesirable extent and lack resilience, failing to return to normal size after stretching.

It is found that while such shoes may fit the wearer's foot perfectly when new, after even moderate use the shoe invariably loses its snug fit because of the violent stretching produced by muscular action together with impregnation of sweat or outside moisture. The wearer may compensate for such stretching to a certain extent by means of the lacing, drawing the shoes more snugly around the instep, but this is only capable of compensating for stretch transversely of the foot. Longitudinal stretch, on the contrary, cannot be compensated for by any known means and, therefore, a shoe soon becomes too long for the wearer's foot and must be discarded because of foot slippage within the shoe, producing unsatisfactory traction and annoyance.

In accordance with my invention, I have provided means whereby a shoe may be rendered substantially immune to excessive longitudinal stretch and which will, also, greatly limit the amount of transverse stretch. I accomplish this object by applying to the shoe a band of material which will permit a limited amount of give, so that the wearer's foot will not feel as if it were enclosed in a vise, but, at the same time, will restrict the amount of stretch to a low minimum. Thus, the life of the shoe will be greatly extended because of the elimination of such excessive stretch as has heretofore required early discarding of the shoe.

The band which is applied to the shoe in accordance with my invention extends substantially from toe to heel thereof along both sides of the upper and may be secured to the shoe in various ways. For example, I have found that a shoe embodying my invention may be produced either by sewing the band along its top and bottom edges either to the outside or the inside of the shoe upper; in another arrangement, the band is interlaced from the outside to the inside of the shoe at spaced points.

My invention will be more fully understood by reference to the appended drawings illustrating preferred embodiments thereof, wherein:

Figure 1 is a side elevational view of a track shoe illustrating a preferred form of my invention;

Figures 2, 3 and 4 are sectional views taken substantially along the lines 2—2, 3—3 and 4—4, respectively, of Figure 1;

Figure 1:
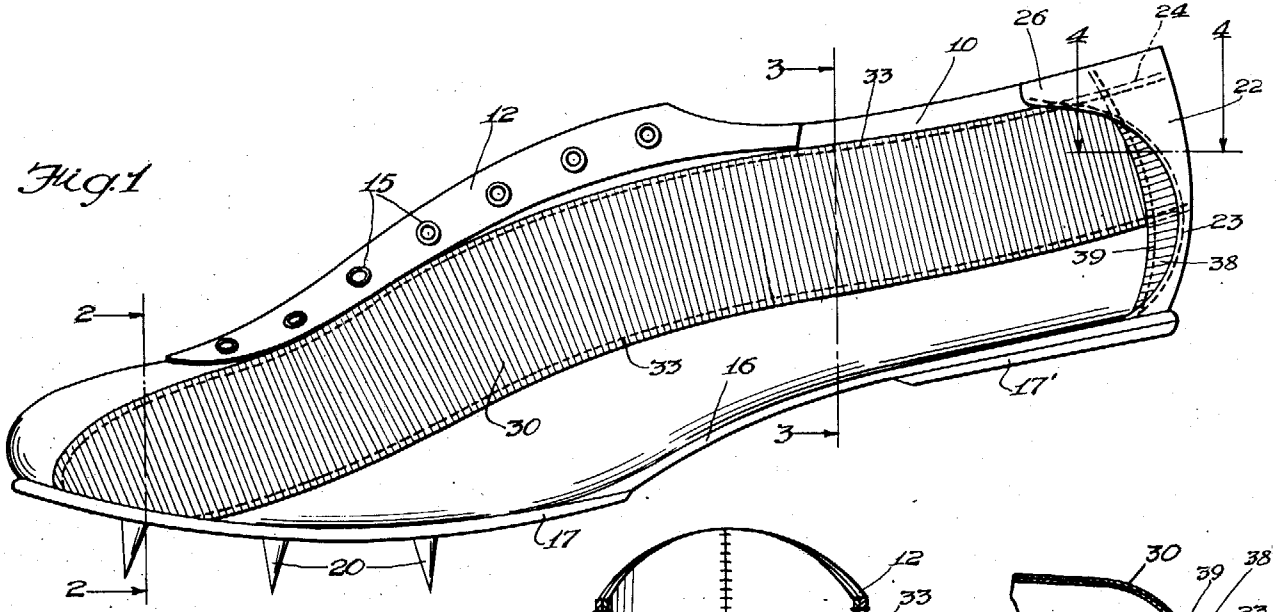
Figure 2:
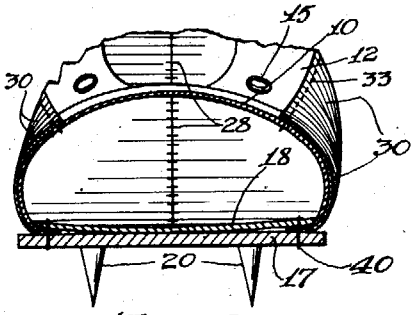
Figure 3:
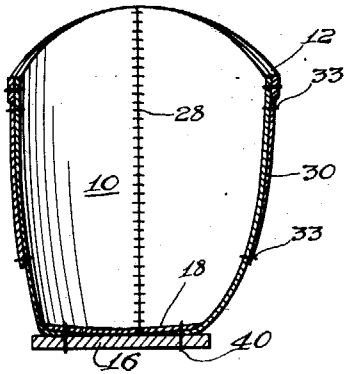

The shoe illustrated is in basic structure substantially a standard type of track shoe as known in the United States for many years. [, although it should be understood, as stated above that my invention is likewise applicable to shoes intended for other purposes. However, my] *My* invention is particularly applicable to shoes of the "Oxford" or "low" type, i. e., wherein the shoe fits snugly around the foot and terminates at or about the base of the ankle.

Referring first to Figures 1–4, inclusive, such a shoe comprises an upper portion 10 which, in the embodiment shown, is formed of a relatively thin, soft and flexible kidskin or like material reinforced as at 12 for lacing eyelets 15, the lacing not being shown. The upper is secured as by stitching to a sole 16 and sole and heel taps 17, 17'. To enhance the light weight of the shoe the sole strip 16 may be skived down at the front and there terminated. The usual insole 18 may be provided and also traction members or spikes 20, as customary in athletic shoes. I also provide a reinforcing heel strip 22 secured at the bottom by stitching (not shown), along the side edges by stitching 23 and at the top by a double row of stitching 24, the upper portion of said heel strip having wing-like extensions 26. It will be understood that the upper portion 10 is formed of a single piece of leather which is seamed together as at 28 under the heel strip 22.

Secured to the upper and extending from toe to heel thereof is a relatively wide band of textile fabric material 30. Said material is preferably of such a type as will provide extremely limited stretch in one direction, i. e., longitudinally of the shoe, say, to an extent of the order of about 1%. Such fabric should be of a tightly woven type and various types of weave and various fibers may be employed, such as cotton, silk or synthetic fibers such as those known on the market as acetate rayon, nylon, etc. A highly satisfactory weave is that known in the textile industry as webbing which, as seen best in Figure 1, is arranged in such a way that its limited give or stretch is substantially only in a longitudinal direction.

The width of the band 30 is such that said band occupies a substantial proportion of the width of the upper from the reinforcing portion 12 to the sole, preferably about one-half or more of said width.

The band 30 is preferably formed of a single length of material extending uninterruptedly around the heel of the shoe, being secured to the upper 10, either on the inside or outside, but preferably on the outside thereby by stitching 33, so as not to be felt by the wearer, and the ends of the band being stitched under the toe of the shoe, as at 40.

As an alternative construction, instead of forming the band 30 in one piece, it may be formed in two pieces secured individually by stitching to the upper 10 at or adjacent the heel, as, for example, under the heel strip 22.

The band 30 functions effectively to limit the amount of longitudinal stretch of the shoe to an extremely low minimum regardless of the amount of flexing action given the shoe by the wearer and regardless of how much moisture may be imparted to the upper leather by perspiration or otherwise. At the same time, the slight yielding permitted by the fabric band 30 which is slightly resilient, tending to return after stretching to its original length, will add comfort to the wearer because, although his foot will be firmly enclosed in the soft, form-fitting shoe throughout the entire flexing action of the foot, at the same time there will be no uncomfortably tight feeling as if the foot were bound in a vise. The slight yielding permitted by the character of band 30 will negative any such discomfort.

Although, as stated above, transverse stretch can be overcome by increasingly tight lacing during the life of a shoe of this type, in the ordinary shoe there comes a time after some use when the reinforced marginal portions 12 meet because of the stretching of the leather and stretching beyond this point results only in undesirable bagginess of the shoe, for which no compensation can thereafter be made. The substantial width of the band 30 prevents such effect, because of the relatively slight width of upper leather not covered by the band.

The upper leather below band 30, being unreinforced, of course, retains its maximum flexibility and thus may conform perfectly to the curvature of the foot around the more muscular portions thereof.

In order to prevent still further the stretching of the upper leather at the heel portion, I prefer to secure under the heel strip 22 a band 38 of fabric similar to that of the band 30. The fabric band 38 is preferably arranged with its weave disposed transversely to that of the band 30, so that its limited give will be transversely of the shoe. Said band 38 may be secured along its side edges, either over or under the strip 30, as by stitching 39.

The method of manufacture of the shoe described above will be obvious from the above description to anyone skilled in the art. Preferably, the bands 30 and 38 are stitched to the upper 10 before the upper is attached to the sole as by stitching 40.

Figure 4:
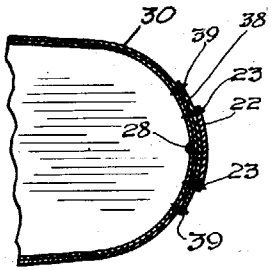
Figure 5:
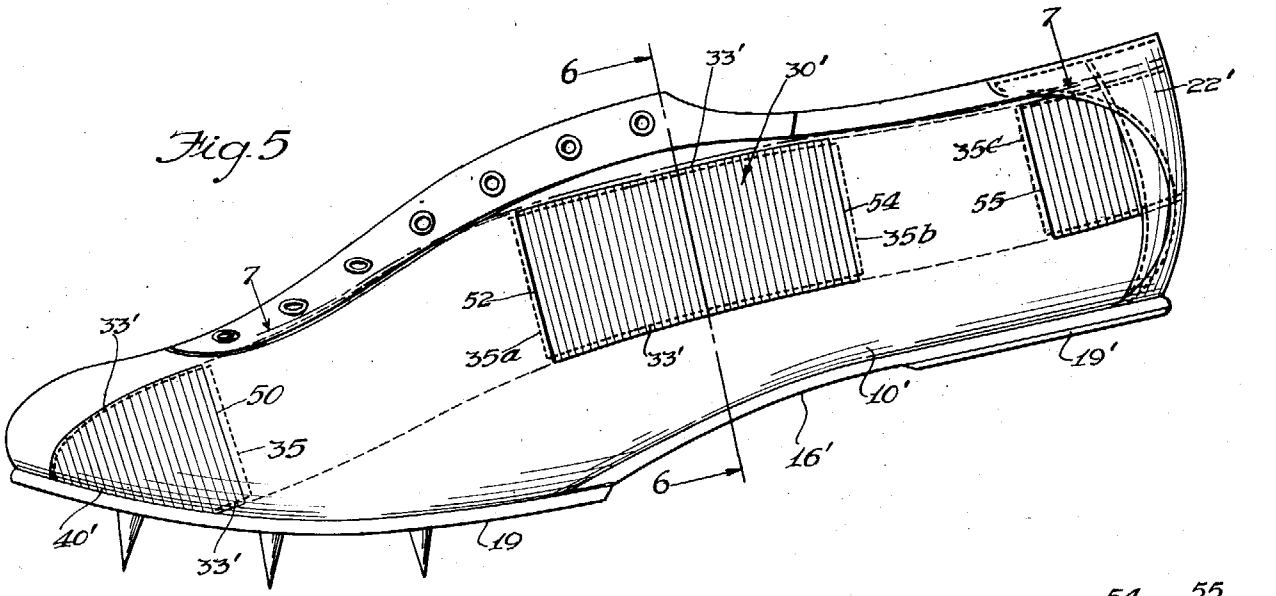
Figure 5 is an elevational view similar to Figure 1 but showing another embodiment of my invention.
Figure 7:
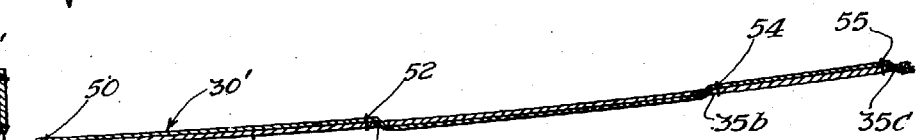
Figure 7 is a fragmentary sectional view taken substantially along the line 7—7 of Figure 5 but substantially straightened out for convenience of illustration.
Figure 6:
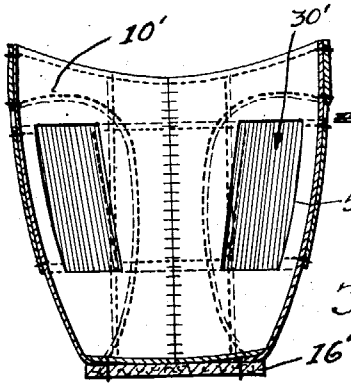
Figure 6 is a sectional view taken substantially along the line 6—6 of Figure 5.

Referring now to the embodiment illustrated in Figures 5–7, inclusive, the shoe is constructed substantially similarly to the shoe of Figures 1–4 in regard to the orthodox parts of its structure, having an upper portion 10' and a sole portion 16' and sole taps 19 and 19'.

A band 30' of fabric or the like substantially similar to the band 30 shown in the other figures is secured adjacent the toe portion of the shoe as at 40' in the same manner described for the other embodiment and extends longitudinally of the shoe to the heel portion 22', being secured thereto in a manner similar to the embodiment of Figures 1 and 4.

However, in the embodiment of Figures 5–7 the band 30', instead of being secured entirely to one side of the shoe upper, is interlaced from the outside to the inside thereof, as seen best in Figure 5. Thus, the band 30' is secured to the outside of the shoe adjacent the toe portion, being stitched to the upper as at 33', and then extends through a slit 50 into the inside of the shoe. It then extends unattached to a slit 52, at which point the band passes from the inside back to the outside of the shoe, extending along the outside and stitched thereto at 33' to another slit 54; the band passes through the slit 54 and again extends unattached along the inside of the shoe to a slit 55 through which it passes, continuing along the outside thereof and being stitched to the shoe from this point to the heel as in the embodiment of Figure 1. The band 30' is also secured as by stitching 35, 35*a*, 35*b* and 35*c* adjacent the slits 50, 52, 54 and 55.

As a result of the interlacing arrangement just described, the shoe snugly conforms to the shape of the foot and retains this snug fit throughout strenuous flexing, as in running. By leaving the band partially unstitched, close conformity of the band with the foot is maintained despite some stretching of the upper leather.

The band may, of course, be stitched entirely on the inside of the shoe, if desired.

Various changes coming within the spirit of my invention are susceptible of being incorporated without departing from the essential spirit or scope thereof. Hence, I do not wish to be limited to the particulars of the accompanying illustrations and drawings nor by the language chosen in the foregoing description, except to the extent indicated in the appended claims.

This application is in part a continuation of my copending application, Serial No. 131,873, filed December 8, 1949, now abandoned.

I claim:

*1.* A running shoe comprising a sole, calks carried by the ball portion of the sole, the heel portion of said sole being free of anti-slipping means, a low-cut upper of soft leather, and longitudinal stretch-preventing means comprising a substantially non-stretchable tape extending longitudinally on each side of the upper from the toe to the heel thereof and stitched along its side margins to the outside of the upper, the forward ends of said tape being turned under with the margin of the upper and secured between the outsole and the upper, said tape being of a width approximately half the height of the sides of the upper and spaced from the top and bottom margins along the greater length thereof, whereby to provide a continuous toe-to-heel flat band anchored adjacent the toe to opposite sides of the shoe and extending around the heel for eliminating excessive stretching of the upper and insuring a continuous snug fit throughout a major area of the shoe.

*2. A running shoe comprising a sole, calks carried by the ball portion of the sole, the heel portion of said sole being free of antislipping means, a low-cut upper of soft leather, and longitudinal stretch-preventing means comprising a substantially non-stretchable tape extending longitudinally on each side of the upper from the toe to the heel thereof and stitched along its side margins thereto, the forward ends of said tape being turned under with the margin of the upper and secured to the outsole, said tape being of a width approximately half the height of the sides of the upper and spaced from the top and bottom margins along the greater length thereof, whereby to provide a continuous toe-to-heel flat band anchored adjacent the toe to the opposite sides of the shoe and extending around the heel for eliminating excessive stretching of the upper and ensuring a continuous snug fit throughout a major area of the shoe.*

References Cited in the file of this patent or the original patent

UNITED STATES PATENTS

| | | |
|---|---|---|
| 859,382 | Hansen | July 9, 1907 |
| 1,623,007 | Herrmann | Mar. 29, 1927 |
| 1,707,129 | McMurchy | Mar. 26, 1929 |
| 2,048,294 | Roberts | July 21, 1936 |
| 2,158,153 | Roberts et al. | May 16, 1939 |
| 2,184,082 | Roberts | Dec. 19, 1939 |
| 2,184,261 | Vamos | Dec. 19, 1939 |
| 2,188,168 | Winkel | Jan. 23, 1940 |

FOREIGN PATENTS

| | | |
|---|---|---|
| 24,582/08 | Great Britain | Feb. 11, 1909 |